Patented Oct. 30, 1923.

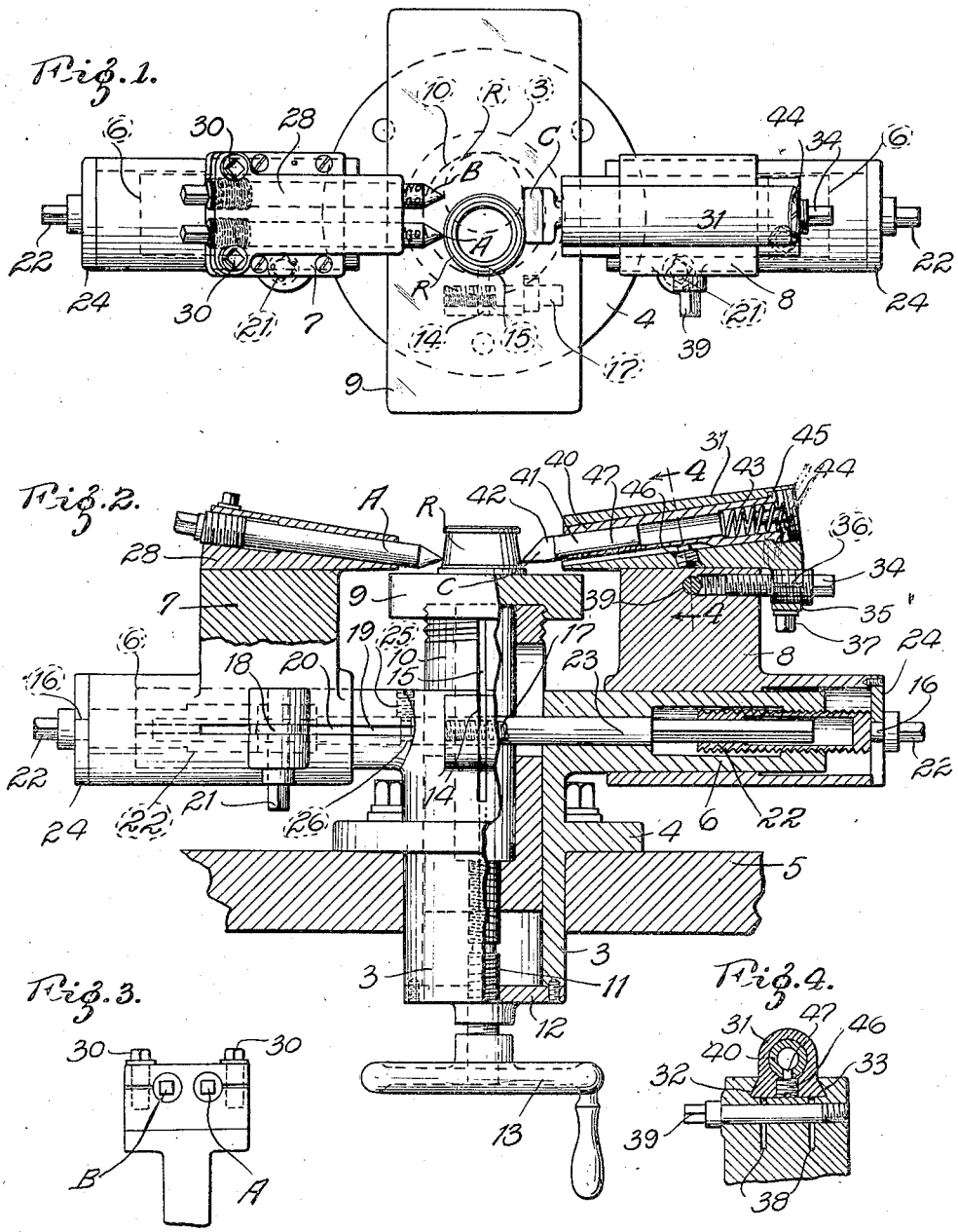

1,472,196

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

LIMIT GAUGE.

Application filed June 3, 1922. Serial No. 565,648.

*To all whom it may concern:*

Be it known that I, OSWALD SCHLAUPITZ, a citizen of the United States, and a resident of the city of Canton, county of Stark, and State of Ohio, have invented a certain new and useful Improvement in Limit Gauges, of which the following is a specification.

This invention relates to limit gauges for determining the outside measurements of articles of manufacture, such, for instance, as the circular inner bearing members of antifriction bearings, and has for its principal object to provide a plurality of adjustments whereby the gauge is adapted for use in gaging articles of different sizes and shapes. Another object is to simplify the gaging operation. Another object is to provide means for maintaining the desired adjustment of the gaging points in the event that an article of a width greater than the distance between said gaging points is forced therebetween. Other objects are simplicity and cheapness of construction and compactness of design.

The invention consists principally in the improved limit gauge hereinafter shown and described; and it also consists in the combinations and arrangements of parts hereinafter described and claimed.

In the accompanying drawing, wherein like symbols refer to like parts wherever they occur, Fig. 1 is a plan view of a limit gauge embodying my invention;

Fig. 2 is a central vertical section thereof partly in side elevation; and

Fig. 3 is an end elevation of the upper portion of the left-hand rider; and

Fig. 4 is a vertical section through the upper portion of the right-hand rider and the contact supporting slide thereon on the line 4—4 in Fig. 2.

The present gauge, which is of the "limit" or "go and no go" type, is designed particularly with reference for use in gaging conical or cylindrical bearing members R for roller bearings, although it is also adapted for measuring other articles of manufacture of various sizes and shapes. The gauge comprises a base member in the form of an upright hollow cylinder 3 having a circular supporting flange 4 adapted to rest on and be bolted or otherwise rigidly secured to a work bench or other suitable support 5. The portion of the cylinder or column 3 located below the circular supporting flange 4 thereof projects through an opening in the bench 5; and the portion of said column located above said flange is provided with a pair of oppositely projecting hollow cylindrical arms 6 adapted to slidably support left and right-hand contact supporting members or riders 7 and 8.

A vertically adjustable work support comprises a table portion 9 and a depending cylindrical shank or stem portion 10 which is slidably mounted in the vertical bore in the upright column 3 of the base member. The lower end of the stem portion 10 of the work supporting table is threaded to receive the left-hand screw threaded upper portion of an adjusting screw 11, whose lower portion is provided with right-hand screw threads and is threaded through a closure plate 12 fixed to the lower end of the column 3 of the base member. A hand wheel 13 is fixed to the lower end of the adjusting screw 11, whereby said screw may be readily rotated to raise or lower the work supporting table. Rotation of the shank portion 10 in the bore of the column is prevented by means of a key 14 which slidably engages a keyway 15 formed in said shank portion. The upper portion of the hollow column 3 is split to receive the key 14; and a clamp screw 17 is provided for securing said key to said column and for clamping the shank portion 10 of the work supporting table 9 in the desired adjusted position.

The pair of left and right-hand riders 7 and 8 are disposed one on each side of the work supporting table 9 and are bored horizontally to receive the supporting arms 6, whereby said riders are adapted for horizontal sliding movement towards and away from each other. Rotation of the riders on the supporting arms 6 is prevented by keys 18 having a sliding fit in keyways 19 formed in the exterior surface of said arms. The riders 7 and 8 are slotted as at 20, to receive the keys 18; and clamp screws 21 are provided securing said keys in said slots and for clamping said riders to the supporting arms 6 in the desired adjusted position.

The riders 7 and 8 are moved towards and away from each other simultaneously and at the same rate of speed by means of a pair of adjusting screws 22, one of which is threaded into the outer end of the bore in each of the hollow supporting arms 6. The adjusting screw for the left-hand rider is provided with left-hand screw threads; and the adjusting screw for the right-hand rider is provided with right-hand screw threads. The adjusting screws are connected together for joint rotary movement by means of a shaft 23 having a cylindrical middle portion, journaled in the inner ends of the bores in the supporting arms, and squared end portions fitted into squared openings in the inner ends of the adjusting screws 22. With this arrangement, the riders may be quickly advanced towards or retracted from the work supporting table 9 by turning either one of the adjusting screws 22. The riders 7 and 8 are preferably connected to the adjusting screws 22 by means of circular end plates 24, which are rigidly secured to the outer ends of the bored hub portions of the riders, constituting closures therefor, and are each provided with an elongated notch which embraces a reduced portion 16 formed in the outer end of each adjusting screw. Longitudinal movement of the shaft 23 is prevented by a screw 25, which is threaded into the left-hand supporting arm and has a reduced lower end portion projecting into an annular groove 26 formed in the said shaft 23.

Fixed to the top of the left-hand rider 7 is a contact support or rest 28 whose forward end portion overhangs the work supporting table 9. The rest 28 is provided with a pair of horizontally spaced inclined bores, which extend from end to end of the rest, longitudinally of the supporting arm 6, and are adapted to receive a pair of cylindrical contact pins A and B. The forward ends of the pair of contact pins A and B are tapered to a point; and in practice, one pin of said pair is commonly marked "Go" and the other contact pin of said pair is commonly marked "No go." The contact pins A and B have threaded outer end portions adapted to cooperate with the threaded outer end portions of the bores in which they are mounted; and said portions of said pins are also shaped to receive a suitable tool, whereby said pins may be adjusted longitudinally of their axes. The walls of the threaded portion of the bores in which the contact pair are mounted are split, and clamp screws 30 are provided, whereby said contact pins may be clamped in the desired adjusted positions.

Mounted for horizontal sliding movement on the right-hand rider 8 is a contact support or rest 31, whose side is beveled to form a beveled tongue 32 which is slidably fitted into an undercut groove or channel 33 extending longitudinally of the supporting arms, whereby said rest is adapted for horizontal sliding movement towards and away from the work supporting table and the rider 7 on the opposite side thereof. The slide 31 is adjusted longitudinally of the slideway 33 by means of a horizontal adjusting screw, whose smaller diameter is provided with thirteen threads to the inch, and whose larger diameter is provided with twenty threads to the inch. This screw is threaded into axially alined threaded bores in a depending lug 35 at the rear end of said slide and the rear face of the rider 8, respectively. The wall of the threaded bore in the depending lug 35 of the slide 31 is split horizontally, as at 36; and a clamping screw 37 extends through said split portion, whereby the adjusting screw 34 for said slide is adapted to be locked in the desired adjusted position. The bottom of the undercut slideway 33 has a pair of narrow slits 38 extending from end to end thereof; and a clamping screw 39 extends horizontally through the rider crosswise of said slots, whereby the walls of said slideway are adapted to be drawn towards each other to clamp the undercut tongue portion 32 of the slide 31 therebetween in the desired adjusted position.

Mounted in a bore, which extends longitudinally of the slide 31 from end to end thereof is a plunger in the form of a cylindrical tube 40. The forward end portion of the bore in the hollow plunger 40 is tapered to receive the tapered shank portion 41 of contact member C having a widened and beveled contact head 42, which overhangs the work supporting table 9 and is of a width greater than the distance between the contact points of the pair of gauge pins A and B.

The rear end portion of the bore on the plunger 40 is enlarged to receive a coil spring 43, one end of which bears against the annular shoulder formed by such enlargement and tends to force said plunger forward. The other end of the spring 43 bears against the inner face of a screw plug 44 which is threaded into the enlarged rear end portion of the bore in which the plunger is mounted, said plug constituting a closure for said bore and means for adjusting the pressure of said spring and for retaining the same in position. A stop collar 45 is formed on the rear end of said plunger and is adapted to abut against the shoulder formed by the enlarged rear end portion of the bore therefor, thereby limiting the movement of said plunger in the direction of the work supporting table. A guide screw 46 is threaded upwardly through the base of the slide 31 and has a reduced upper end portion that projects into a keyway 47 formed in the exterior surface of the spring-pressed plunger 40. This plunger guide screw prevents rotation of the plunger 40 in the bore of the slide 31 while permitting sliding movement of said plunger in said bore.

The gaging device is used as follows: The work supporting table 9 is adjusted vertically by means of the hand wheel 13 to a height that will bring a cone supported thereon in line with the adjacent contact ends of the contact members A, B and C. A master cone of maximum size is then placed on the table and slid between the contact points of the contact members A and C. The contact members A and C are then adjusted, in the manner hereinbefore described, to bring the contact points thereof into contact with the opposite sides of said maximum master cone. A master cone of minimum size is then placed on the table and slid between the contact points of the contact members B and C, and contact member B is adjusted, in the manner hereinbefore described, to bring the contact point thereof into contact with said minimum master cone. The cones that are to be inspected are then placed on the work table and slid between points A and C. If the cone passes freely between these points and does not pass between the points B and C, the cone is of the desired size; that is, the size between the limits set by the gaging points A, B and C. If the cone passes between the points B and C, the diameter of the cone is shown to be too small and the cone should be rejected as being undersize. If the cone does not pass through points A and C, the diameter is shown to be excessive and the cone should be rejected as being over size.

In the event that an over size cone is forced between the gaging points, damage to the gauge is prevented by the contact member C, which yields an amount sufficient to enable said over size cone to pass between the contact points without springing the gauge or disturbing original setting thereof.

The pressure of the spring 43 is sufficient to permit a cone, whose diameter is within the limits set by the maximum and minimum master cones, to be slid between the points of the contact members without disturbing the spring pressed contact member C; but if the cone is of a diameter larger than the limits set by the master cones said spring yields and permits the contact member C to be pushed back by the over size cone without springing the contact members. After such oversize cone has been forced between the contact members, the contact member C is returned to its original position by the spring 43 without disturbing the setting of the gauge.

It is evident that numerous changes may be made without departing from the invention and I do not wish to be limited to the precise construction shown and described.

What I claim is:

1. A gaging device comprising a base, a vertically adjustable article support mounted thereon, a pair of opposed gaging members mounted on said base and arranged one on each side of said support, one of said members being stationary and the other of said members being arranged to yield under the pressure of an article passing between said members, and means for independently adjusting each of said members towards and away from each other to vary the normal gap therebetween.

2. A limit gauge comprising a base, an article support adjustably mounted thereon, a pair of gaging members arranged on one side of said support, and a single gaging member mounted on said base and located on the other side of said support, and means for independently adjusting each member of said pair of gaging members towards and away from said single gaging member to vary the gap between each member of said pair of gaging members and said single gaging member.

3. A limit gauge comprising a base, a vertically adjustable article support mounted thereon, a pair of gaging members mounted on said base and arranged on one side of said support, and a single gaging member mounted on said base and located on the other side of said support and arranged to yield under the pressure of an article passing between said pair of gaging members and said single gaging member, and means for independently adjusting each member of said pair of gaging members and said single gaging member towards and away from each other to vary the normal gap between each member of said pair of gaging members and said single gaging member.

4. A limit gauge comprising a base, an article support mounted thereon, a pair of gaging members mounted on said base and arranged on one side of said support, and a single gaging member mounted on said base and arranged on the other side of said support, means whereby said pair of gaging members and said single gaging member are adapted for joint bodily movement towards and away from each other and means for imparting such movement.

5. A limit gauge comprising a base, a vertically adjustable article support mounted thereon, a pair of independently horizontally adjustable gaging members mounted on said base and arranged on one side of said support, and a single spring-pressed gaging member mounted on said base and arranged on the other side of said support, means whereby said pair of gaging members and said single gaging member are adapted for joint bodily movement towards and away from each other at the same rate of travel, and means for imparting such movement.

6. A gaging device comprising a base, a vertically adjustable article support mounted thereon, a pair of independently horizontally adjustable gaging members mounted on said base and arranged one on each side of said support, means whereby said pair of gaging members are arranged for joint bodily movement towards and away from each other, means for imparting such movement, and means for locking said pair of gaging members in the desired adjusted position.

7. A gaging device comprising a base, a vertically adjustable article support mounted thereon, a pair of gaging members disposed one on each side of said article support, one of said gaging members being yieldably mounted, a pair of supporting members for said pair of gaging members, said supporting members being mounted on said base, means for adjusting each of said gaging members with relation to the supporting member therefor, and means operatively connecting said pair of supporting members, whereby they are adapted for joint bodily movement towards and away from said article support.

8. A limit gauge comprising a base, a work support mounted thereon, a pair of gaging members mounted on said base and located on one side of said work support, and a single gaging member mounted on said base and located on the other side of said support, and means operatively connecting said pairs of gaging members with said single gaging member, whereby said gaging members are adapted for joint bodily movement towards and away from said work support.

9. A limit gauge comprising a base, a vertically adjustable work support mounted thereon, a pair of gaging means located on one side of said support, and a single spring-pressed gaging member located on the other side of said support, a pair of supporting members for said gaging members, said supporting members being movably mounted on said base, means for adjusting said pair of gaging members with relation to the supporting member therefor, means for adjusting said single gaging member with relation to the supporting member therefor, and means operatively connecting said pair of supporting members, whereby said members are adapted for joint bodily movement towards and away from said work support.

10. A gaging device comprising a base, an article support mounted on said base, a pair of supports mounted on said base and arranged one on each side of said article support, means whereby said supports are adapted for joint bodily movement towards and away from each other, means for imparting such movement, a holder on each of said supports, means for adjusting one of said holders toward and away from the other of said holders, a pair of independently adjustable gaging members mounted on one of said supports, and a single adjustable gaging member adjustably mounted on the other of said supports.

Signed at Canton, Ohio, this 31st day of May, 1922.

OSWALD SCHLAUPITZ.